Figure 1A:
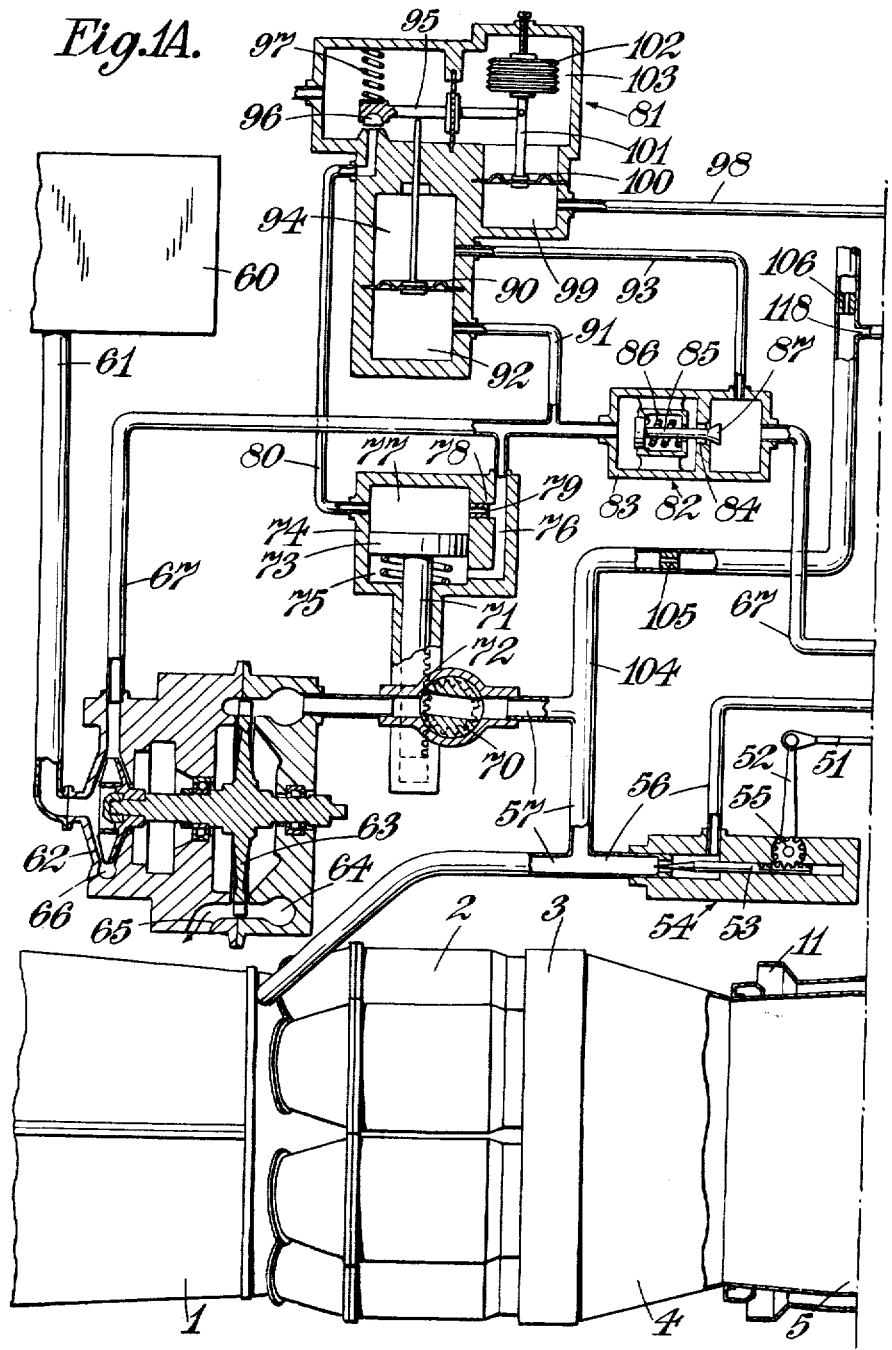

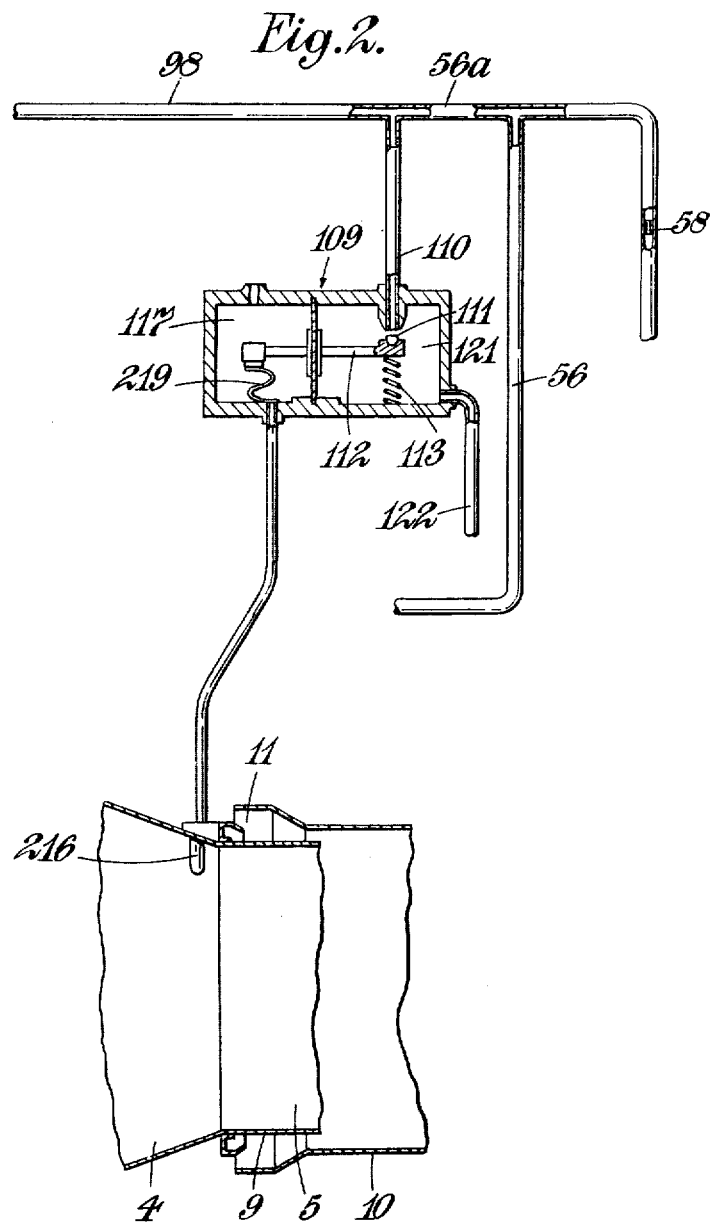

2,964,904
United States Patent Office
Patented Dec. 20, 1960

2,964,904

GAS TURBINE WITH REHEAT COMBUSTION EQUIPMENT AND FUEL CONTROL THERETO

David Omri Davies, Kingsway, Derby, England, assignor to Rolls-Royce Limited, Derby, England, a British company Filed Aug. 2, 1954, Ser. No. 447,017

Claims priority, application Great Britain Sept. 14, 1953

10 Claims. (Cl. 60—35.6)

This invention is concerned with gas turbine engines, and relates more particularly to gas turbine engines of the kind having reheat combustion equipment in which fuel is burned in the exhaust gases before the latter pass to atmosphere and also having a variable-area exhaust nozzle through which the exhaust gases pass to atmosphere as a propulsive jet.

According to this invention in one aspect, a gas turbine engine of the kind described comprises means to select a desired value of the effective area of the variable nozzle, and means to schedule the rate of fuel flow to said reheat combustion equipment in accordance with the selected effective area of the nozzle.

According to a feature of this aspect of the invention, the means to schedule the rate of fuel flow to the reheat combustion equipment comprises means to reduce the rate of fuel flow with decrease of the ambient atmospheric pressure. In a preferred arrangement the rate of fuel flow is reduced in accordance with the compressor delivery pressure of the compressor.

According to another feature of this aspect of the invention there is provided means responsive to the rate of flow of fuel to the reheat combustion equipment and to a pressure which is a function of the compressor delivery pressure of the engine, and operative to control said rate of flow to be proportional to said pressure, and means operative on variation of the effective area of the variable nozzle to vary said function.

According to yet another feature of this aspect of the invention, there is provided a linear-flow valve in a fuel delivery pipeline to the reheat combustion equipment, a conduit connected to the delivery of the compressor of the engine and comprising restrictor means whereby there is produced a pressure which is in a desired ratio to the compressor delivery pressure, means to adjust said restrictor means to vary said desired ratio in accordance with the selected effective area of the variable nozzle, and pressure-responsive means which is responsive to the pressure drop across said linear flow valve and to said pressure in the desired ratio to the compressor delivery pressure and operative to control the rate of flow of fuel to maintain said pressure drop in a desired relation to the pressure in the desired ratio to the compressor delivery pressure.

According to this invention in another aspect, a gas turbine engine of the kind described comprises basic control means to schedule the rate of flow of fuel to the reheat combustion equipment in accordance with the compressor delivery pressure and trimming control means to modify the rate of flow so scheduled, in accordance with the static or total head pressure or temperature in the jet pipe of the engine, whereby the static or total head pressure or temperature in the jet pipe is maintained in preselected relation to the compressor delivery pressure.

According to a feature of this aspect of the invention, there is provided a pressure-responsive device responsive to a pressure which is representative of the rate of fuel flow to the reheat combustion equipment of the engine and to a control pressure and operative to vary the rate of fuel flow to maintain it in preselected relation to said control pressure, means to produce a basic pressure which is in preselected relation to the compressor delivery pressure of the engine, and trimming control means to modify said basic pressure in accordance with the jet pipe static or total head pressure or temperature, thereby to produce said control pressure.

Figure 1B:
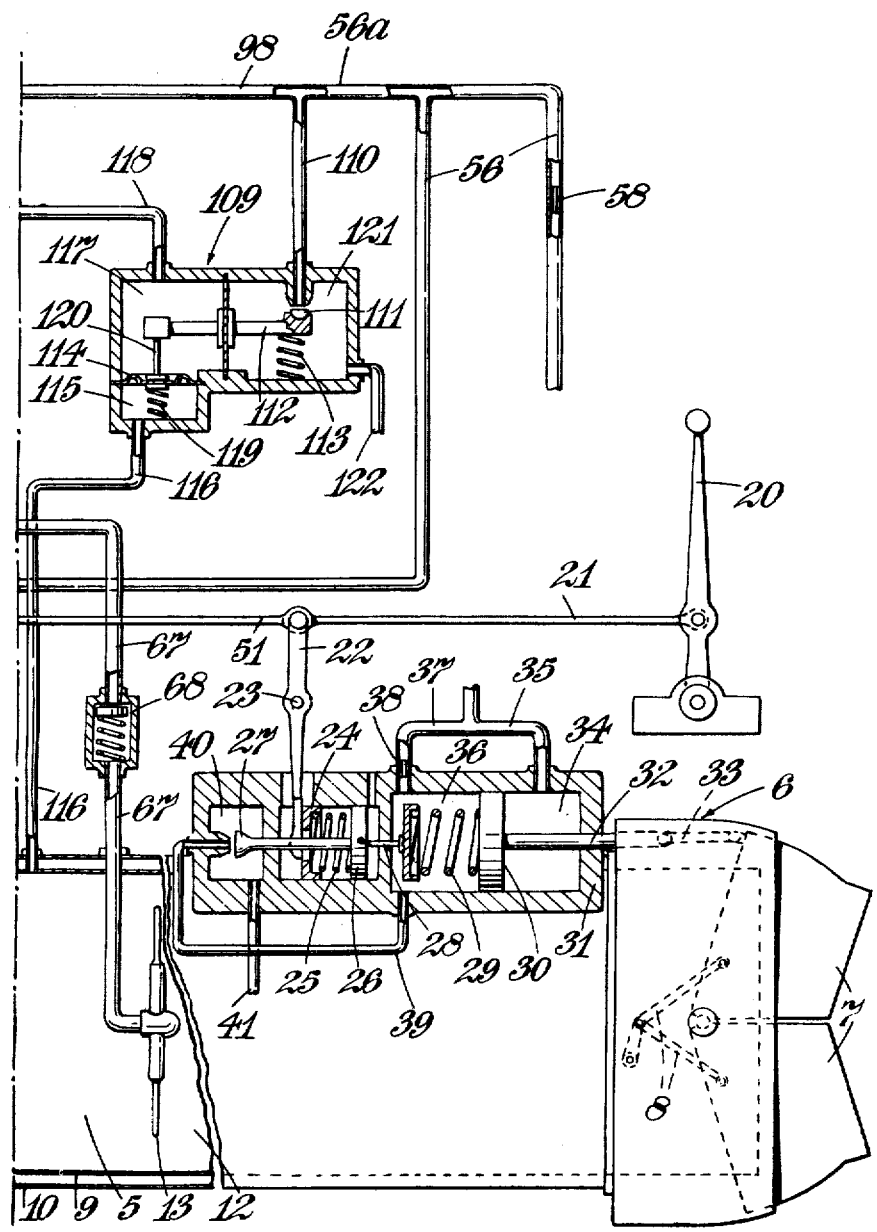

One embodiment of this invention will be described with reference to the accompanying drawings in which:

Figure 1A shows diagrammatically part of a gas turbine engine and part of a control system in accordance with the invention, Figure 1B shows the remainder of the engine and of the control system. The two figures of drawings meet on the chain line, and Figure 2 illustrates a modification using a temperature responsive device.

The gas turbine engine comprises a compressor 1, combustion equipment 2 to which air is delivered by the compressor to have fuel burnt therein, and a turbine 3 receiving the products of combustion and connected to the compressor to drive it. The exhaust from the turbine is delivered into the exhaust cone 4 and thence into the jet pipe 5, and passes to atmosphere as a propulsive jet through a variable-area propelling nozzle generally indicated at 6. The propelling nozzle may be of any known or convenient type, and is shown as comprising a pair of part-spherical nozzle elements 7 mounted to pivot about a common diameter and co-operating with the outlet end of the jet pipe 5. The elements 7 are shown as being interconnected for simultaneous movement by links 8.

The jet pipe comprises an inner skin 9 which defines the exhaust gas duct and an outer skin 10 which forms a cooling air jacket having air inlets 11 at its upstream end. The air flowing in the jacket is conveniently extracted at the downstream end by the ejector effect of the jet gases. The inner skin 9 of the jet pipe is divergent at its upstream end, and is then cylindrical, and the cylindrical part forms a reheat combustion chamber 12 in which the exhaust gases are reheated to increase their exit velocity, and the reheat combustion equipment also comprises reheat fuel injectors 13. There may also be provided baffles (not shown) to assist in the maintenance of combustion in the reheat chamber, and there may for example be provided a pilot reheat fuel injector (not shown) to assist in stabilising the combustion of fuel injected through the main reheat fuel injectors 13.

In accordance with this invention there is provided control means by which the degree of opening of the variable-area nozzle 6 and the quantity of reheat fuel injected are correlated. It will be appreciated that the rate of injection of reheat fuel should be reduced as the altitude of the aircraft is increased, in order to prevent overheating of parts of the engine, and in the embodiment to be described the rate of fuel injection is varied automatically in accordance with the compressor delivery pressure of the engine for each "degree of reheat" selected by the operator (Figure 2), and the appropriate degree of opening of the variable-area nozzle is also determined by the selection of the desired "degree of reheat." The rate of fuel injection is also modified in accordance with the static pressure in the jet pipe.

Each "degree of reheat" may for example correspond with a given temperature in the reheat combustion chamber 12, and the degree of opening of the variable-area nozzle 6 for each rate of reheat fuel injection may for example be chosen so as to result in a constant gas temperature in the exhaust cone 4 upstream of the reheat combustion chamber. For this purpose, as the "degree of reheat," the reheat combustion chamber temperature, and the rate of reheat fuel flow are increased, assuming for the moment that the engine rotational speed is constant, so the effective area of the propelling nozzle must be increased.

A lever 20 is provided for the selection of the "degree of reheat" and the corresponding nozzle opening, and the latter is determined in the following manner.

The lever 20 is connected by a rod 21 to a lever 22 pivoted about a central fixed fulcrum 23, and the other end of lever 22 bears against the movable abutment 24 of a spring 25. The spring 25 loads a piston 26 which is open at both sides to atmosphere and which is rigidly connected on one side to a vent valve member 27, and the piston 26 is loaded on its other side through a rod 28 by another spring 29 which at its other end abuts a servo-piston 30 acting in a servo-cylinder 31. The servo-piston 30 is of the differential area kind as a piston-rod 32 extends from its side remote from spring 29 through the end of cylinder 31. The piston rod 32 is connected to the periphery of a nozzle element 7 through a pivoted link 33. The cylinder space 34 on the side of the servo-piston having the rod 32 extending from it is connected directly to a source of fluid pressure (not shown) through pipe 35, and the cylinder space 36 on the other side of the servo-piston 30 is connected to the same source through pipe 37 containing a restriction 38. A vent pipe 39 leads from the cylinder space 36 and has an outlet into a chamber 40 controlled by the vent valve member 27. The chamber 40 contains the vent valve 27 and has a drain connection 41 leading from it.

On movement of lever 20 in the direction corresponding to increase of nozzle area (to the left as shown in the drawing), the lever 22 is rocked compressing spring 25 thereby moving piston 26 slightly to the right and moving the vent valve member 27 away from the outlet of vent pipe 39. This causes a fall in pressure in chamber 36, and servo-piston 30 moves to the left moving the nozzle elements 7 to open the nozzle, and simultaneously compressing spring 29. When the load due to spring 29 becomes equal to that of spring 25, the piston 26 and vent valve member 27 are restored to the equilibrium position, and the loads on piston 30 are also brought into equilibrium. When the lever 20 is moved to the right, relieving the load on spring 25, the reverse process occurs and servo-piston 30 moves to the right, reducing the nozzle area, until the loads on the piston 30 reach equilibrium.

It will thus be seen that for each position of lever 20 between the limits of its travel, there is a corresponding position of nozzle elements 7 and thus a corresponding nozzle area.

The corresponding rate of supply of fuel to the reheat fuel injectors 13 is also selected by means of the lever 20, and is effected in this case through a rod 51 which connects lever 20 with the radius arm 52 controlling the movement of the valve member 53 of a needle valve shown generally at 54, through a rack-and-pinion mechanism 55, and which conveniently is moved in accordance with movements of lever 20 by being connected to the junction of rod 21 and lever 22.

Needle valve 54 constitutes a variable-area restriction in a conduit 56 which is connected at its upstream end to a pipe-line 57 of large diameter connected to the delivery of the compressor 1, so that the pressure at the upstream end of conduit 56 is substantially that of the compressor delivery. It will be understood that the pipe-line 57 may be connected to the delivery of an intermediate stage of the compressor, provided the pressure is high enough, or to the air casing of the combustion equipment so as to receive air compressed by the compressor before it is heated by combustion, in well-known fashion.

Conduit 56 is also provided with a fixed-area restriction 58 downstream of needle valve 54, the fixed-area restriction 58 being of such size that it is choked in operation at engine speeds at which reheat is to be used. The downstream end of conduit 56 exhausts to atmosphere or to any other point which is at low pressure compared with the compressor delivery pressure.

Fuel is supplied to the injectors 13 from a tank 60 which is connected by a suction pipe 61 with the inlet of a centrifugal pump 62. The pump impeller is mounted on the same shaft as an air turbine 63 by which it is driven, and the air turbine has an inlet volute 64 connected to the downstream end of pipe-line 57 so that the air turbine is supplied with air compressed by the compressor. The air after passing through the air turbine 53 exhausts to atmosphere through outlet 65. The delivery volute 66 of the centrifugal pump 62 is connected to a delivery pipe-line 67 which is connected at its downstream end to the injectors 13, and which contains a non-return valve 68 to prevent the pipe-line being filled with exhaust gas when the reheat system is inoperative.

Pipe-line 57 has in it a throttle valve 70 connected to be rotated by a piston-rod 71 through a rack-and-pinion mechanism 72. The piston-rod is connected to one side of a piston 73 acting in a cylinder 74 so that the piston is of the differential area kind. The cylinder space 75 on the smaller-area side of the piston 73 is connected directly to a source of fluid under pressure, for example as shown to pipe-line 67 through conduit 76, and the other cylinder space 77 is connected to the same source through conduit 78 containing a restriction 79. There is also a vent pipe 80 from the cylinder space 77 leading to a pressure-responsive device indicated generally at 81, the purpose of which is to maintain the fuel flow in conduit 67 proportional to a control pressure.

The pipe-line 67 has in it a linear-flow valve shown generally at 82, that is a valve through which the flow is directly proportional to the difference of pressure in the pipe-line 67 from upstream to downstream of the valve. The valve comprises a valve body 83 having a valve orifice 84 with which co-operates a movable valve member 85 which is loaded by a spring 86 in the sense of closing the valve, against the load exerted on the head 87 of the valve due to the pressure drop across the valve caused by the flow therethrough. The shape of the head 87 and the characteristics of spring 86 are selected to give the desired linear flow/pressure difference characteristic.

The pressure difference from upstream to downstream of linear-flow valve 82 is applied across a diaphragm 90 of pressure-responsive device 81 by means of pipe-line 91 which connects pipe-line 67 upstream of valve 82 with chamber 92 on one side of diaphragm 90, and pipe-line 93 which connects pipe-line 67 downstream of valve 82 with chamber 94 on the other side of diaphragm 90.

The pressure-responsive device 81 includes a pivoted lever 95 which carries a half-ball vent valve 96 at one end to co-operate with the outlet of vent pipe 80, and the pressure difference across diaphragm 90 is arranged to load the lever 95 in the sense to open the vent valve 96, and a light spring 97 loads the lever 95 in the sense to close the vent valve.

The lever 95 is also loaded in the sense to close the half-ball vent valve 96 by a control pressure, which is derived in a manner to be explained and which is conducted through pipe-line 98 to a chamber 99 bounded by a diaphragm 100. The diaphragm 100 is connected to the lever 95 through a rod 101, which is connected at its other end to an evacuated capsule 102 of the same area as diaphragm 100; thus the load applied to lever 95 by diaphragm 100 is not influenced by the pressure in chamber 103 containing rod 101.

The control system also includes a second conduit 104 connected at its upstream end to the large diameter pipeline 57, the conduit 104 having in it a pair of fixed-area restrictors 105, 106. The conduit 104 exhausts to atmosphere.

The control pressure applied to diaphragm 100 is obtained in the following manner: a pipe 56a is connected to conduit 56 between restrictions 54 and 58, and this pipe 56a is connected at its other end to pipe-line 98 and also to a trimming control 109 by means of a pipe-line 110 the outlet of which is controlled by a half-ball valve 111 carried by a pivoted lever 112. The lever 112 is loaded by a spring 113 in the sense to close half-ball valve 111, and is also loaded by a diaphragm 114 having on one side a chamber 115 connected to the inner skin 9 of the jet pipe through pipe-line 116 so that the pressure in the chamber is the static pressure in jet-pipe 5, and having on the other side a chamber 117 connected through a pipe 118 to the second conduit 104 between the restrictors 105, 106, so that the chamber 117 is subjected to a pressure which is proportional to the compressor delivery pressure of the engine, the proportion being determined by the relative areas of the restrictors 105, 106. The diaphragm 114 is thus loaded differentially by the static pressure in the jet-pipe 5 in the sense of opening vent valve 111, and by the pressure in the second conduit 104 in the sense of closing the vent valve. A light spring 119 loads diaphragm 114 to maintain contact between a rod 120 and the lever 112; the chamber 121 containing vent valve 111 is vented to atmosphere through drain pipe 122. In an alternative arrangement the chamber 115 may be subjected to jet pipe total head pressure by means of a pitot tube facing upstream in the jet pipe.

The operation of the system is as follows: the rate of fuel flow to burner 13, represented by the pressure difference across diaphragm 90, is maintained proportional to the control pressure applied to diaphragm 100; when the rate of fuel flow is greater than the desired proportion the half-ball valve 96 is opened venting space 77, and causing piston 73 to move up closing throttle valve 70 thus reducing the fuel flow, and when the rate of fuel flow is less than the desired proportion the valve 96 is closed, causing piston 73 to move down and increasing the fuel flow.

The control pressure is a function of the compressor delivery pressure of the engine; assuming for the purpose of the immediate explanation that vent valve 111 of trimming control 109 is closed, or is choked and has a fixed opening, the pressure in conduit 56 between restrictions 54 and 58 when downstream restrictor 58 is choked is directly proportional to the compressor delivery pressure and to the degree of opening of needle valve 54 which corresponds to the setting of the nozzle 6. The "degree of reheat" may therefore be selected by adjustment of the needle valve 54, and movement of lever 20 in the direction to the left as shown in the drawing (which corresponds to an increase in the area of the nozzle 6) causes withdrawal of valve member 53 and increase in area of the needle valve, a higher pressure in conduit 56 between restrictors 54 and 58, and an increase in the rate of fuel flow to the reheat combustion equipment.

Since the compressor delivery pressure of the engine is substantially directly proportional to the atmospheric pressure at constant engine rotational speed, the rate of fuel flow will also be reduced as the atmospheric pressure decreases, that is, as the altitude increases, in substantially the same proportion as the mass flow of air consumed by the engine decreases. The control pressure determined in this manner thus determines approximately the rate of fuel supply.

The final control is done by the trimming control 109, which is arranged to vary the control pressure in chamber 99 from the value of the pressure in conduit 56 between restrictions 54 and 58 when the vent valve 111 is closed, or is choked and has a fixed opening. In the equilibrium positon the vent valve 111 will be between the fully open and the fully closed positions. The trimming control senses the value of the static pressure in the jet pipe and controls this pressure, which depends in part on the intensity of reheat combustion in the jet-pipe 5, so that it is always equal to the pressure in conduit 104 between restrictors 105 and 106 and is thus always in a given proportion to the compressor delivery pressure.

On increase of the area of final nozzle 6 by means of the mechanism 22—41, an increased rate of reheat fuel flow is selected by the opening of needle valve 54, causing the pressure in conduit 56 between restrictors 54 and 58 to become a higher proportion of the compressor delivery pressure and thus causing pressure-responsive device 81 to act to open the throttle 70 and to cause an increased rate of fuel flow to the reheat fuel injectors 13.

Increase of area of the final nozzle 6 also causes a reduction of the static pressure in jet pipe 5, which acts on the trimming control 109 to tend to close the vent valve 111 thus also causing pressure-responsive device 81 to act to open the throttle 70 and to cause an increased rate of fuel flow.

Increased combustion of fuel in the reheat combustion chamber 12 causes an increase in the static pressure in the jet pipe 5, which tends to restore the vent valve 111 of the trimming control 109 to the equilibrium position in which the load due to jet pipe static pressure in chamber 115 together with the load of spring 119 balances the load due to the pressure in chamber 117, which is proportional to the compressor delivery pressure, together with the load of spring 113. If the jet pipe static pressure rises above the value corresponding to this equilibrium state vent valve 111 will tend to open, reducing the rate of fuel flow, and if it falls below this value the vent valve 111 will tend to close and increase the rate of fuel flow.

Thus it will be seen that for each effective area of the variable-area nozzle 6 there will be a certain "degree of reheat" in which the rate of fuel flow to the reheat fuel injectors 13 will depend only on the compressor delivery pressure, and that for every position of the variable-area nozzle and the corresponding "degree of reheat" the jet pipe static pressure will have a value in constant relation to the compressor delivery pressure. This ensures that, at a given engine rotational speed, the pressure drop across the turbine will be unaffected by changes in the area of the variable-area nozzle and in the intensity of reheat combustion.

The greater is the area of the final nozzle 6, the greater will be the "degree of reheat," that is the rate of fuel flow to the reheat combustion equipment and thus the combustion intensity, and for any given final nozzle area and degree of reheat, the reheat fuel flow and combustion intensity will be reduced on increase of the operating altitude of the engine in accordance with the compressor delivery pressure.

The trimming control 109 compensates for changes in combustion efficiency of the reheat burning by sensing the corresponding change in static pressure and adjusting the fuel flow to give an increased flow when the efficiency is lower, and vice versa.

It will be appreciated that various arrangements of the restrictors 54, 58 and 105, 106 are suitable to produce a pressure which is a known proportion of the pressure in the conduit upstream of the restrictors; examples of these arrangements are disclosed in co-pending application United States Serial No. 426,320, filed April 29, 1954, now Pat. 2,872,781.

In one arrangement the conduit 104 is led at its downstream end to exhaust to jet pipe static pressure, so that the pressure between restrictors 105, 106 is a function both of compressor delivery pressure and of jet pipe static pressure.

Various changes may be made within the scope of the invention, for example in the control of the fuel supply the air throttle 70 may be replaced by a throttle valve in the fuel delivery pipe-line, or the control may be effected on the delivery-varying member of a variable-delivery-pump.

In place of the trimming control 109 responsive to compressor delivery pressure and to jet pipe pressure, there may alternatively be provided a trimming control responsive to the temperature of the engine working fluid upstream of the reheat combustion chamber 12.

A temperature-responsive element will be situated either in the exhaust cone 4, or in the upstream end of the jet pipe 5, or in certain cases between two stages of the turbine 3, and it will be appreciated by those skilled in the art that, as disclosed in my United States Patent No. 2,674,843, on increase of the fuel flow to the reheat fuel injectors 13 there will ceteris paribus be a rise in the temperature sensed by the element, and vice versa. The increase in temperature in fact corresponds to a rise in the value of the ratio of jet pipe pressure to compressor delivery pressure, and may be employed to operate a vent valve such as the valve 111 to tend to open the valve on increase of temperature, tending to close throttle 70 and reduce the fuel flow, and vice versa.

The temperature-responsive element may be a thermocouple and may be connected to operate the valve 111 through any known or convenient electrical means, or it may for example be in the form of a mercury vapour bulb 216 (Figure 2) and the valve may be operated by a pressure-sensitive device such as a Bourdon tube 219 connected to be subjected to the pressure of the mercury vapour.

I claim:

1. A gas-turbine engine comprising a compressor, main combustion equipment, a turbine driving the compressor, a jet pipe and a variable-area outlet nozzle in flow series arrangement, and reheat combustion equipment in the jet pipe, and further comprising manual control means, means to control the effective area of the variable nozzle, fuel-flow-scheduling means to schedule the rate of fuel flow to the reheat combustion equipment including means to reduce the rate of fuel flow with decrease of the ambient atmospheric pressure, means interconnecting said manual means, said nozzle control means and said fuel flow scheduling means so that as said manual means is moved over a range of settings the effective area of the nozzle is progressively varied between a minimum value and a maximum value and the rate of fuel flow schedule by said fuel-flow-scheduling means is also varied correspondingly between minimum and maximum values which are dependent on the ambient atmospheric pressure, and trimming control means responsive to both a pressure dependent on the compressor delivery pressure and a pressure in the jet pipe upstream of the reheat combustion equipment, which jet pipe pressure varies upon variation of combustion efficiency in the reheat combustion equipment, said trimming control means being connected to vary the rate of fuel flow determined by said fuel-flow scheduling means in a sense to maintain a selected value of said pressure in the jet pipe relative to the compressor delivery pressure.

2. A gas-turbine engine as claimed in claim 1, wherein said means to reduce the rate of fuel flow with decrease of ambient atmospheric pressure comprises means adapted to respond to the compressor delivery pressure and adapted on decrease of the compressor delivery pressure to reduce the rate of fuel flow.

3. A gas-turbine engine as claimed in claim 1, wherein the means to reduce the rate of fuel flow with decrease of ambient atmospheric pressure comprises means responsive to the rate of flow of fuel to the reheat combustion equipment and to a control pressure which is a function of the compressor delivery pressure of the engine, and operative to control said rate of flow to be proportional to said control pressure, said interconnecting means being operative to vary said function between the control pressure and the compressor delivery pressure.

4. A gas-turbine engine as claimed in claim 1, wherein the means to reduce the rate of fuel flow to the reheat combustion equipment with decrease of the ambient atmospheric pressure comprises a linear-flow valve in a fuel delivery pipeline to the reheat combustion equipment, a conduit connected to the delivery of the compressor of the engine and adjustable flow restrictor means in said conduit whereby there is produced in said conduit a pressure which is in a desired ratio to the compressor delivery pressure, said interconnecting means being operative to adjust said restrictor means to vary said desired ratio in accordance with the selected effective area of the variable nozzle, and pressure-responsive means which is responsive to the pressure drop across said linear flow valve and to said pressure which is in the desired ratio to the compressor delivery pressure and operative to control the rate of flow of fuel to maintain said pressure drop in a desired relation to the pressure which is in the desired ratio to the compressor delivery pressure.

5. A gas-turbine engine comprising a compressor, main combustion equipment, and a turbine in flow series arrangement, reheat combustion equipment in which turbine exhaust gases are heated before being passed to atmosphere, a variable-area exhaust nozzle at the outlet from said reheat combustion equipment and through which the exhaust gases pass to atmosphere as a propulsive jet, motor means to adjust the effective area of said variable-area exhaust nozzle, selectively-operable means adjustable to select the effective area of the variable-area exhaust nozzle and adapted to control the operation of said motor means, fuel supply means to deliver fuel into said reheat combustion equipment including fuel injectors in said reheat combustion equipment and a fuel delivery conduit connected to said fuel injectors, fuel-supply-adjusting means to vary the rate of fuel delivery through said fuel delivery conduit, pressure-responsive means controlling the operation of said fuel-supply adjusting means, means producing a fluid pressure proportional to the rate of fuel flow in said fuel delivery conduit and connected to load said pressure-responsive means in a sense to tend to decrease the fuel flow on increase thereof and vice versa, an air-tapping conduit connected to said compressor to receive air compressed therein, a pair of flow restrictors in flow series in said tapping conduit, one of said restrictors being of variable effective area and being connected to said selectively-operable means to be adjusted thereby in a sense to increase the pressure between said flow restrictors on actuation of said selectively-operable means to cause increase of the area of said variable-area exhaust nozzle, a pressure fluid connection from said air-tapping conduit between said restrictors to said pressure-responsive means to load said pressure-responsive means in a sense to cause a reduction in the fuel flow on decrease of said fluid pressure in said air-tapping conduit between two restrictors and trimming control means responsive to both a pressure dependent on the compressor delivery pressure and a pressure in the reheat combustion equipment upstream of the fuel injectors which pressure in the reheat combustion equipment varies on variation of combustion efficiency in the reheat combustion equipment, said trimming control means being connected to vary the value of the pressure between said restrictors in a sense to maintain a selected ratio of said pressure in the reheat combustion equipment upstream of the fuel injectors to the compressor delivery pressure.

6. A gas-turbine engine as claimed in claim 5, wherein said trimming control means comprises second pressure-responsive means subjected in one sense to said pressure in the reheat combustion equipment and in the opposite sense to said pressure dependent on compressor delivery pressure, an outlet pipe connected to said air-tapping conduit between said two restrictors and a valve controlling the flow through said outlet pipe, said second pressure-responsive means being connected to operate said valve.

7. A gas-turbine engine as claimed in claim 6, wherein said second pressure-responsive means comprises a first connection leading therefrom to said reheat combustion equipment so that the pressure therein is the static pressure within said reheat combustion equipment upstream of the fuel injectors, and a second pressure connection connected to the compressor whereby the pressure therein is a fixed proportion of the compressor delivery pressure.

8. A gas-turbine engine as claimed in claim 7, wherein said second pressure connection is connected to a third conduit between a pair of fixed restrictors therein, said third conduit being connected at its upstream end to the compressor to be supplied with air compressed in the compressor.

9. A gas-turbine engine comprising a compressor, main combustion equipment, and a turbine in flow series arrangement, reheat combustion equipment in which turbine exhaust gases are heated before being passed to atmosphere, a variable-area exhaust nozzle at the outlet from said reheat combustion equipment and through which the exhaust gases pass to atmosphere as a propulsive jet, motor means to adjust the effective area of said variable-area exhaust nozzle, selectively-operable means adjustable to select the effective area of the variable-area exhaust nozzle and adapted to control the operation of said motor means, fuel supply means to deliver fuel into said reheat combustion equipment including fuel injectors in said reheat combustion equipment and a fuel delivery conduit connected to said fuel injectors, fuel-supply-adjusting means to vary the rate of fuel delivery through said fuel delivery conduit, pressure-responsive means controlling the operation of said fuel-supply adjusting means, means producing a fluid pressure proportional to the rate of fuel flow in said fuel delivery conduit and connected to load said pressure-responsive means in a sense to tend to decrease the fuel flow on increase thereof and vice versa, an air-tapping conduit connected to said compressor to receive air compressed therein, a pair of flow restrictors in flow series in said tapping conduit, one of said restrictors being of variable effective area and being connected to said selectively-operable means to be adjusted thereby in a sense to increase the pressure between said flow restrictors on actuation of said selectively-operable means to cause increase of the area of said variable-area exhaust nozzle, a pressure fluid connection from said air-tapping conduit between said restrictors to said pressure-responsive means to load said pressure-responsive means in a sense to cause a reduction in the fuel flow on decrease of said fluid pressure in said air-tapping conduit between two restrictors and trimming control means comprising temperature-responsive means positioned in the engine to respond to a temperature within the reheat combustion equipment upstream of the fuel injectors, said trimming control means being connected to vary the value of the pressure between said restrictors in a sense to maintain a selected ratio of the pressure in the reheat combustion equipment upstream of the injectors to the compressor delivery pressure.

10. A gas-turbine engine as claimed in claim 9, wherein said trimming control means comprises an outlet pipe connected to said air-tapping conduit between said two restrictors, a valve controlling the flow through said outlet pipe, said temperature-responsive means being connected to control said valve.

References Cited in the file of this patent

UNITED STATES PATENTS

| | | |
|---|---|---|
| 2,565,854 | Joynstone et al. | Aug. 28, 1951 |
| 2,570,591 | Price | Oct. 9, 1951 |
| 2,641,105 | Drake | June 9, 1953 |
| 2,643,514 | Jubb | June 30, 1953 |
| 2,667,743 | Lee | Feb. 2, 1954 |
| 2,669,094 | Lee | Feb. 16, 1954 |
| 2,673,447 | Ifield et al. | Mar. 30, 1954 |
| 2,674,843 | Lombard | Apr. 13, 1954 |
| 2,677,233 | Jordan | May 4, 1954 |
| 2,713,767 | Alford et al. | July 26, 1955 |
| 2,714,803 | Abild | Aug. 9, 1955 |
| 2,736,166 | Mock | Feb. 28, 1956 |
| 2,739,441 | Baker et al. | Mar. 27, 1956 |
| 2,746,242 | Reed | May 22, 1956 |
| 2,789,417 | Kuzmitz | Apr. 23, 1957 |
| 2,814,928 | Davies et al. | Dec. 3, 1957 |
| 2,830,436 | Coar | Apr. 15, 1958 |